United States Patent
Proctor et al.

(10) Patent No.: US 8,143,329 B2
(45) Date of Patent: Mar. 27, 2012

(54) METHOD OF MAKING KAOLIN CONTAINING SILICONE RUBBER COMPOSITIONS

(75) Inventors: Michael Proctor, The Vale of Glamorgan (GB); Rosemary Taylor, Vale of Glam (GB)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/581,563

(22) PCT Filed: Dec. 2, 2004

(86) PCT No.: PCT/EP2004/014512
§ 371 (c)(1),
(2), (4) Date: Jun. 2, 2006

(87) PCT Pub. No.: WO2005/054352
PCT Pub. Date: Jun. 16, 2005

(65) Prior Publication Data
US 2007/0093589 A1 Apr. 26, 2007

(30) Foreign Application Priority Data
Dec. 5, 2003 (GB) .................................. 0328236.5

(51) Int. Cl.
*C08K 3/36* (2006.01)
(52) U.S. Cl. ...................................... 523/212; 524/447
(58) Field of Classification Search .................. 523/212; 524/447
See application file for complete search history.

(56) References Cited

U.S. PATENT DOCUMENTS

| 4,156,674 | A | * | 5/1979 | Sumimura | 524/720 |
| 4,614,758 | A | * | 9/1986 | Schwabe et al. | 524/487 |
| 4,677,141 | A | * | 6/1987 | Cornelius et al. | 523/203 |
| 4,966,638 | A | * | 10/1990 | Mudgett | 156/51 |
| 5,319,427 | A | * | 6/1994 | Sakurai et al. | 399/333 |
| 5,863,968 | A | | 1/1999 | Irish et al. | |
| 6,136,994 | A | * | 10/2000 | Joseph et al. | 556/400 |
| 6,354,620 | B1 | | 3/2002 | Budden et al. | |
| 6,410,641 | B2 | * | 6/2002 | Sato et al. | 524/588 |
| 6,645,637 | B2 | * | 11/2003 | Kaltenborn et al. | 428/447 |
| 6,737,458 | B2 | * | 5/2004 | Woerner et al. | 524/251 |
| 2005/0203236 | A1 | * | 9/2005 | Prowell et al. | 524/447 |
| 2008/0139731 | A1 | * | 6/2008 | Lawson et al. | 524/447 |
| 2009/0023849 | A1 | * | 1/2009 | Bradshaw et al. | 524/447 |
| 2010/0324197 | A1 | * | 12/2010 | Bradshaw et al. | 524/447 |

FOREIGN PATENT DOCUMENTS

| EP | 0057084 A2 | 8/1982 |
| EP | 0150385 A2 | 8/1985 |
| EP | 0820807 A1 | 1/1998 |
| EP | 1149871 A2 | 10/2001 |
| JP | 2000007921 A | 1/2000 |
| JP | 2000023731 A | 1/2000 |
| WO | 2004070102 A2 | 8/2004 |
| WO | WO2004/070102 A2 | 8/2004 |
| WO | WO2005/092965 A1 | 10/2005 |

* cited by examiner

*Primary Examiner* — Margaret Moore
(74) *Attorney, Agent, or Firm* — Howard & Howard Attorneys PLLC

(57) ABSTRACT

A treated kaolin containing silicone rubber composition consisting essentially of an organopolysiloxane, treated kaolin, a curing agent; and optional additives selected from the group of one or more rheology modifiers, pigments, coloring agents, anti-adhesive agents, plasticizers, adhesion promoters, blowing agents, fire retardants and dessicants which composition is substantially free of reinforcing fillers. These finished kaolin containing silicone rubber compositions are useful in applications such as silicone profile extrusions, wire and cable coatings, glazing, and for construction gaskets.

21 Claims, No Drawings

METHOD OF MAKING KAOLIN CONTAINING SILICONE RUBBER COMPOSITIONS

RELATED APPLICATIONS

This application claims priority to and all the advantages of International Patent Application No. PCT/EP2004/014512, filed on Dec. 2, 2004, which claims priority to Great Britain Patent Application No. GB 0328236.5, filed on Dec. 5, 2003.

This invention is related to highly filled silicone rubber compositions containing a treated kaolin a method of producing highly filled silicone rubber compositions containing a treated kaolin. In particular, it relates to the use of kaolin as substantially the only filler in the silicone rubber composition.

Silicone rubber, often referred to as silicone elastomer, is composed of three essential ingredients. These ingredients are (i) a substantially linear high molecular weight silicone polymer, (ii) one or more filler(s), and (iii) a curing agent, sometimes referred to as a crosslinking agent or a vulcanising agent. Generally, there exist two main types of silicone rubber compositions which are heat vulcanised or high temperature vulcanising (HTV) silicone rubber compositions, often also referred to as high consistency rubber (HCR); and room temperature vulcanising (RTV) silicone rubber compositions, however the latter term may be misleading as many RTV compositions require a modicum of heat to progress the reaction at a reasonable rate.

HTV silicone rubber compositions are typically prepared by mixing the substantially linear high molecular weight silicone polymer with the filler and other desired additives to form a base or raw stock. Prior to use, the base is compounded to incorporate the curing agent, other fillers, and additives such as pigments, anti-adhesive agents, plasticizers, and adhesion promoters; and it can be vulcanised by press vulcanisation or continuously by extrusion, i.e., injection and transfer moulding, to form the final silicone rubber product. For example, cable insulation is extruded by special techniques in which the silicone rubber is applied to cable cores by means of angular extruder heads.

The substantially linear high molecular weight silicone polymer most widely employed is a polysiloxane gum having a viscosity of 1,000,000 centistoke ($mm^2$/s) or more. These polysiloxane gums generally contain a siloxane backbone (—Si—O—) to which are linked alkyl groups such as for example methyl, ethyl, propyl, isopropyl and t-butyl groups, and unsaturated groups for example alkenyl groups such as allyl, 1-propenyl, isopropenyl, or hexenyl groups but vinyl groups are particularly preferred and/or combinations of vinyl groups and hydroxyl groups to assist in their crosslinking. Such polysiloxane gums typically have a degree of polymerisation (DP) of 500-10,000, which represents the number of repeating units in the polymer.

Generally, two types of fillers are used; these are usually referred to as reinforcing fillers and non-reinforcing fillers. Reinforcing fillers impart high strength to vulcanised rubber and may comprise finely divided amorphous silica such as fumed silica and precipitated silica. Extending or non-reinforcing fillers are generally used to reduce the cost of the silicone rubber composition, and generally comprise inexpensive filler materials such as ground quartz, calcium carbonate, and diatomaceous earth. Reinforcing fillers are typically used alone or together with extending or non-reinforcing fillers. The reinforcing fillers are usually treated with organosilanes, organosiloxanes, or organosilazanes, in order to improve the physical and/or mechanical properties of the silicone rubber composition, i.e., tensile strength and compression set.

The curing agents most widely used are organic peroxides which are capable of generating free radicals when heated to form crosslinks by reacting with the methyl and where present alkenyl groups on the linear high molecular weight silicone polymer. Some commonly used organic peroxides are the non-vinyl specific organic peroxides such as benzoyl peroxide, 1,4-dichlorobenzoyl peroxide, 2,4-dichlorobenzoyl peroxide, di-t-butyl peroxide, dicumyl peroxide, tertiary butyl-perbenzoate, and monochlorobenzoyl peroxide; and the vinyl specific organic peroxides such as ditertiary-butyl peroxide, 2,5-bis-(tertiarybutyl-peroxy)-2,5-dimethylhexane, tertiary-butyl-trimethyl peroxide, tertiary-butyl-tertiary-butyl-tertiary-triphenyl peroxide, and t-butyl perbenzoate.

Silicone rubber compositions including HTV silicone rubber compositions can be, and often are, evaluated using various parameters including tensile strength which is the amount of force needed to break a rubber sample, elongation which is the length a rubber sample can be stretched, and compression set which is the amount of force needed for the permanent deformation of a rubber sample.

U.S. Pat. No. 4,677,141 (Jun. 30, 1987) entitled "Method of Improving Heat Stability of Pigmentable Silicone Elastomer", assigned to the same assignee as the present invention, and hereinafter referred to as the '141 patent, is most representative of the above state of the art, over which the present invention is intended an improvement. The '141 patent describes a means of improving the heat stability of a pigmentable silicone elastomer comprising a vinyl terminated organopolysiloxane polymer, a silica based reinforcing filler and an organic peroxide curing agent with a white clay such as kaolin which has been pretreated with olefinic unsaturated siloxy groups. EP0057084 relates to a similar technology but again requires the presence of a reinforcing filler, in the form of silica.

WO 2004/070102 which has an International filing date later than the priority date of the present application describes a coating material for coating textile fabrics, in particular airbags which comprises 15 to 30 parts by weight of a filler per 100 parts of the weight of the total composition of a filler having a Moh hardness no greater than 4.5 and a mean particle size no greater than 3.0 μm. Kaolin is listed as one option out of a wide variety of inorganic compounds deemed suitable fillers but the examples are substantially directed to the use of calcium carbonate or aluminium trihydrate as the viable alternatives.

In accordance with a first embodiment of the present invention there is provided a treated kaolin containing silicone rubber composition consisting essentially of:

(i) one or more polymers which have the formula $R_2R^1SiO[(R_2SiO)_x(RViSiO)_y]SiR_2R^1$ wherein each R is the same or different and is an alkyl group containing 1-6 carbon atoms, a phenyl group or a 3,3,3-trifluoroalkyl group, preferably each R group is a methyl or ethyl group; $R^1$ is a hydroxy group or an alkenyl group, x is an integer and y is zero or an integer and x+y is between 700 and 10 000;

(ii) treated kaolin (iii) a curing agent; and (iv) optional additives selected from the group of one or more rheology modifiers, pigments, colouring agents, anti-adhesive agents, plasticizers, adhesion promoters, blowing agents, fire retardants and dessicants, which composition is substantially free of reinforcing fillers.

The organopolysiloxane polymer comprises one or more polymers which preferably have the formula $R_2R^1SiO[(R_2SiO)_x(RViSiO)_y]SiR_2R^1$ wherein each R is the same or different and is an alkyl group containing 1-6 carbon atoms, a phenyl group or a 3,3,3-trifluoroalkyl group, preferably each R group is a methyl or ethyl group; $R^1$ is a hydroxy group or an alkenyl group, preferably vinyl or hexenyl group; x is an integer and y is zero or an integer and x+y is between 700 and 10 000. In one embodiment the organopolysiloxane is a mixture of two polysiloxane gums having the formulas $R_2ViSiO[(R_2SiO)_x(RViSiO)_y]SiR_2Vi$ and $R_2ViSi(R_2SiO)_xSiR_2Vi$ wherein R is an alkyl group containing 1-6 carbon atoms, Vi is vinyl, and x and y are 500-1,000.

Representative polysiloxane gums preferred according to the invention are high molecular weight gums with the formula $Me_2ViSiO[(Me_2SiO)_x(MeViSiO)_y]SiMe_2Vi$ and high molecular weight gums of the formula $Me_2ViSi(Me_2SiO)_x SiMe_2Vi$ wherein Me represents the methyl group $—CH_3$, Vi represents the vinyl group $CH_2=CH—$, and the degree of polymerisation (DP) is approximately 1,000, i.e., DP corresponds to the value of x or the sum of x and y.

Any suitable kaolin may be utilized, calcined kaolin is particularly preferred. Kaolin is well known in the art. It is an aluminium silicate which mainly comprises $Al_2O_3.2SiO_2.2H_2O$ together with some illite and impurities. Kaolin is particularly useful because it is readily available in a white form. For the purposes of this invention "white" is to be regarded as the absence of a hue or tint of sufficient strength to prevent further pigmenting of the silicone elastomeric composition to a desired colour. Kaolin is further described in the '141 patent incorporated by reference.

As noted, it is an essential feature of the present invention to use a treated kaolin filler, in particular kaolin treated with one or more of the group comprising silane, silazane or short chain organopolysiloxane polymers. Silanes found to be most suitable for the treatment of kaolin are alkoxysilanes of the general formula $R_{(4-n)}Si(OR)_n$, wherein n has a value of 1-3; and each R is the same or different and represents a monovalent organic radical such as an alkyl group, an aryl group, or a functional group such as an alkenyl group, e.g. vinyl or allyl, an amino group or an amido group. Some suitable silanes therefore include alkyltrialkoxysilanes such as methyltriethoxysilane, methyltrimethoxysilane, phenyl tialkoxysilanes such as phenyltrimethoxysilane, or alkenyltrialkoxysilanes such as vinyltriethoxysilane, and vinyltrimethoxysilane. If desired, silazanes can also be used as treating agents for the kaolin filler, such as hexamethyldisilazane; 1,1,3,3-tetramethyldisilazane; and 1,3-divinyltetramethyldisilazane. Short chain organopolysiloxanes might for example include hydroxy terminated polydimethylsiloxanes having a degree of polymerisation of from 2 to 20, hydroxy terminated polydialkyl alkylalkenylsiloxanes having a degree of polymerisation of from 2 to 20 and organopolysiloxanes comprising at least one Si—H group, which may or may not be a terminal group.

A curing agent, as noted above, is required and compounds which can be used herein include organic peroxides such as dialkyl peroxides, diphenyl peroxides, benzoyl peroxide, 1,4-dichlorobenzoyl peroxide, 2,4-dichlorobenzoyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethylhexane, tertiary-butyl-trimethyl peroxide, tertiary-butyl-tertiary-butyl-tertiary-triphenyl peroxide, and t-butyl perbenzoate. The most suitable peroxide based curing agents are benzoyl peroxide, 2,4-dichlorobenzoyl peroxide, di-t-butyl peroxide, and dicumyl peroxide.

The present compositions can also be cured and/or crosslinked by a hydrosilylation reaction catalyst in combination with an organohydrogensiloxane as the curing agent instead of an organic peroxide, providing each polymer molecule contains at least two unsaturated groups suitable for cross-linking with the organohydrogensiloxane. These groups are typically alkenyl groups, most preferably vinyl groups. To effect curing of the present composition, the organohydrogensiloxane must contain more than two silicon bonded hydrogen atoms per molecule. The organohydrogensiloxane can contain, for example, from about 4-20 silicon atoms per molecule, and have a viscosity of up to about 10 Pa·s at 25° C. The silicon-bonded organic groups-present in the organohydrogensiloxane can include substituted and unsubstituted alkyl groups of 1-4 carbon atoms that are otherwise free of ethylenic or acetylenic unsaturation.

Preferably the hydrosilylation catalyst is a platinum group metal based catalyst selected from a platinum, rhodium, iridium, palladium or ruthenium catalyst. Platinum group metal containing catalysts useful to catalyse curing of the present compositions can be any of those known to catalyse reactions of silicon bonded hydrogen atoms with silicon bonded alkenyl groups. The preferred platinum group metal for use as a catalyst to effect cure of the present compositions by hydrosilation is platinum. Some preferred platinum based hydrosilation catalysts for curing the present composition are platinum metal, platinum compounds and platinum complexes. Representative platinum compounds include chloroplatinic acid, chloroplatinic acid hexahydrate, platinum dichloride, and complexes of such compounds containing low molecular weight vinyl containing organosiloxanes. Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_3$, $Rh(C_5H_7O_2)(CO)_2$, $Rh(CO)[Ph_3P](C_5H_7O_2)$, $RbX_3[(R^3)_2S]_3$, $(R^3{}_2P)_2Rh(CO)X$, $(R^2{}_3P)_2Rh(CO)H$, $Rh_2X_2Y_4$, $H_aRh_bolefin_cCl_d$, $Rh(O(CO)R^3)_{3-n}$, (OH), where X is hydrogen, chlorine, bromine or iodine, Y is an alkyl group, such as methyl or ethyl, CO, $C_8H_{14}$ or 0.5 $C_8H_{12}$, $R^3$ is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2,3 or 4, n is 0 or 1. Any suitable iridium catalysts such as $Ir(OOCCH_3)_3$, $Ir(C_5H_7O_2)_3$, $[Ir(Z)(En)_2]_2$, or $[Ir(Z)(Dien)]_2$, where Z is chlorine, bromine, iodine, or alkoxy, En is an olefin and Dien is cyclooctadiene may also be used.

The platinum group metal containing catalyst may be added to the present composition in an amount equivalent to as little as 0.001 part by weight of elemental platinum group metal, per one million parts (ppm) of the composition. Preferably, the concentration of platinum group metal in the composition is that capable of providing the equivalent of at least 1 part per million of elemental platinum group metal. A catalyst concentration providing the equivalent of about 3-50 parts per million of elemental platinum group metal is generally the amount preferred.

This curing alternative is known in the art, and reference can be had to U.S. Pat. No. 5,863,968 (Jan. 26, 1999), for example.

Preferably the mixture in (i) is free of known reinforcing fillers such as silicas. Preferably the mixture is also free of all other fillers. However the composition may comprise up to 5 parts per weight per 100 parts by weight of polymer+treated kaolin of a rheology modifier. Preferably when present the rheology modifier is present in an amount of from 1 to 3 parts by weight per 100 parts by weight of polymer+treated kaolin. The rheology modifier may comprise polytetrafluoroethylene (PTFE), boric acid, amorphous precipitated or fumed silica It is to be understood that the amount of silica present within the ranges permitted are such that it is present in such low amounts so as to have a negligible effect on the physical properties of the resulting composition.

Other additives which may be utilized, depending on the final use/application of the cured composition include pigments and colouring agents, anti-adhesive agents, plasticizers, adhesion promoters, blowing agents, fire retardants and dessicants.

Silicone rubber compositions having equivalent mechanical properties to conventional silicone rubber compositions can be produced according to the present invention in a process which involves no heat, and which avoids the necessity to use expensive fumed silica as a reinforcing filler.

In accordance with a second embodiment of the present invention there is provided a method of making a treated kaolin containing silicone rubber composition consisting essentially of the steps of (i) mixing an organopolysiloxane and treated kaolin under room temperature conditions, the mixture prepared in (i) being free of reinforcing fillers; (ii) adding a curing agent to the mixture in (i); and curing the mixture in (ii) at a temperature above room temperature by the application of heat.

It is to be understood that room temperature conditions means atmospheric pressure and a room temperature at normal ambient temperature of 20-25° C. (68-77° F.). It is a major advantage in the case of the present invention that heat is not required to be added during step (i) as is required when undertaking the in-situ treatment of reinforcing fillers. As in all mixing processes the effect of mixing will generate heat but mixing in the case of the present invention will not require any additional heat input.

The conventional route of preparing highly filled silicone rubber compositions is to first make a silicone rubber base by heating a mixture of fumed silica, a treating agent for the silica, and an organopolysiloxane e.g. a polysiloxane gum in a mixer. The silicone rubber base is removed from the first mixer and transferred to a second mixer where generally about 150 parts by weight of a non-reinforcing or extending filler such as ground quartz is added per 100 parts by weight of the silicone rubber base. Other additives are typically fed to the second mixer such as curing agents, pigments and colouring agents, heat stabilizers, anti-adhesive agents, plasticizers, and adhesion promoters.

The mechanical properties of these finished compositions are known to be generally much lower than the mechanical properties of the silicone rubber base. Thus, highly filled silicone rubber base compositions have relatively high mechanical properties generally represented by a tensile strength in excess of about 8 MPa, an elongation at break in excess of 300 percent, a tear strength greater than 20 $kNm^{-1}$, a hardness (Shore A) of 40-80, and a density of 1.1-1.2 $gcm^{-3}$. However, it is well known that upon compounding of the silicone rubber base into a finished composition, the resulting composition will exhibit mechanical properties which are less than those of the corresponding silicone rubber base, i.e., a tensile strength of 5-7 Mpa, an elongation at break of 180-300 percent, a tear strength of 10-20 $kNm^{-1}$, a hardness (Shore A) of 60-90, and a density of 1.2-1.8 $gcm^{-3}$.

Yet, according to this invention, it is still possible to obtain acceptable levels of mechanical, thermal, and electrical properties, generally represented by property profiles with values such as a tensile strength in excess of 6 Mpa; a hardness (Shore A) of 40-80; a density of 1.1-1.5 $gcm^{-3}$; a dielectric strength greater than about 25 kv; an elongation greater than 150 percent, and a compression set of less than 30 percent, after heat ageing for 240 hours in air at 200° C.

In the process according to the invention, the necessity of making a silicone rubber base containing fumed silica, and then another composition containing a secondary non-reinforcing or semi-reinforcing filler is avoided. Rather, a treated semi-reinforcing kaolin filler is mixed directly with the organoplysiloxane, e.g. polysiloxane gum to produce a finished composition with mechanical properties equivalent to conventional silicone rubber compositions. In addition, the necessity of applying heat is avoided, and the entire process can be carried out quickly and efficiently in a single mixing device.

Because kaolin disperses much more easily than fumed silica in polysiloxane gums, the total mixing cycle is considerably reduced, giving much greater mixer utilization. In addition, since kaolin is a semi-reinforcing filler, it is capable of providing a finished composition having adequate mechanical properties. However, because kaolin is only semi-reinforcing, a higher loading level needs to be used than would be the case for fumed silica. On the other hand, because of the lower cost of kaolin compared to silica, it is not necessary to use a large amount of kaolin to obtain the right level of economic attractiveness for the finished composition. Preferably the ratio of treated kaolin to organopolysiloxane is from 1:2 to 2:1. Thus, one is enabled to use, for example, about 100 parts by weight of kaolin in 100 parts by weight of the organopolysiloxane e.g. polysiloxane gum, without using fumed silica.

The same level of mechanical properties can thereby be obtained as with finished compositions containing fumed silica. Furthermore, the elimination of fumed silica means that no heating is required, and the whole compounding process can be carried out in a single mixer. In addition, the incorporation time for kaolin is much higher than for fumed silica, with the result that mixer capacity is increased by utilizing the faster throughput. Finally kaolin has a much higher bulk density than fumed silica, which allows much improved ease of handling and storage.

These finished kaolin containing silicone rubber compositions are useful in applications such as silicone profile extrusions, wire and cable coatings, glazing, and for construction gaskets. Specific examples include the use of this product in window glazing gaskets, wire and cable such as plenum or safety cable sheathing applications, double glazing spacer gaskets. The only requirement relative to its use is that the finished composition have a property profile roughly equivalent to that acceptable for the particular application. The composition of the present invention may also be used in the production of silicone rubber sponges with the addition of a suitable foaming agent. Any suitable foaming agent may be used. For example the foaming agent may comprise hollow resin particles of the type described in EP1149871 and EP0820807. The resulting product is particularly useful for manufacturing insulating glazing spacer gaskets.

The features that distinguish the method of this invention from that described in the '141 patent are that the only filler present a silane treated kaolin, no heat is applied, the process is substantially free and most preferably totally free of reinforcing fillers such as silica and free of secondary fillers such as ground quartz.

The following examples are set provided in order to illustrate the invention in more detail.

Three kaolin compositions were used in the accompanying examples to illustrate the method of the invention. The kaolins were products manufactured and distributed by Imerys Minerals Limited, Cornwall, United Kingdom. All of the kaolins were composed of calcined kaolin and differed only in the particulars of the process of calcination and the particle size.

All of the examples were carried out using silicone rubber compositions having the same formulation. The formulation consisted of 100 parts by weight of kaolin and 100 parts by weight of polysiloxane gum. The polysiloxane gum consisted of a mixture of equal parts by weight of one polysiloxane gum with the first formula shown above and equal parts by weight of another polysiloxane gum with the second formula shown above. The silicone rubber compositions were prepared by mixing the ingredients in a Braebender®D mixer for 30 minutes. No heat was applied or used during the process. It was all carried out at the existing room temperature.

As used herein, the term room temperature is intended to mean the normal ambient temperature of from 20-25° C. (68-77° F.). The mixed silicone rubber compositions were then press cured into sheets at 116° C. for five minutes using 0.6 parts by weight of 2,4-dichlorobenzoyl peroxide curing agent. The sheets were post cured at 200° C. for four hours before being subjected to testing and evaluation.

The test results shown in the tables reflect the changes in properties of the test sheets on heat ageing of the sheets in air at 200° C. for periods of up to about 240 hours. The properties evaluated were hardness, tensile strength, and elongation to break. Hardness was determined according to the international standard for hardness measurements of rubber, plastic and other non-metallic materials, using a durometer described in the American Society for Testing and Material specification ASTM D2240, which is the recognized specification for the instrument and test procedure.

A typical property profile of silicone rubber compounds containing a silica based reinforcing filler and a non-reinforcing filler comprising e.g. quartz is shown in the following table as a guide:

Property Profile of Silicone Rubber Composition

| Property | Value |
| --- | --- |
| Shore A Hardness | 20-80 |
| Density | 1.1 to 1.5 gcm$^{-3}$ |
| Tensile Strength | >6.0 MPa |
| Elongation at Break | >150 Percent |
| Compression Set | <30 Percent after 22 hours at 177° C. |
| Dielectric Strength | >25 kV |
| Thermal Stability | 6.0 MPa and 150 Percent Elongation at Break after 10 days at 200° C. |

EXAMPLES

The following examples are set forth in order to illustrate the invention in more detail. As used herein, ASTM means the American Society for Testing and Materials, and DIN means the German Institute for Standardization.

Preparation of Treated Kaolin—Procedure A

Calcined kaolin manufactured by Imerys Minerals Limited was placed in the mixing bowl of an ordinary domestic food mixer where it was vigorously stirred and agitated. Treating agent was then introduced into the mixing bowl with the kaolin, in a sufficient quantity to obtain the desired level of treatment of the kaolin surface. The mixer was left to run for 10 minutes after addition of the treating agent. The contents of the mixing bowl were then transferred to a metal tray, and placed in an air circulating oven at 120° C. for a minimum period of 12 hours.

Preparation of Treated Kaolin—Procedure B

Procedure A was repeated except that the treated kaolin was not heat treated.

Compounding

Filler (typically treated kaolin) prepared as described above, was mixed with a polydimethylsiloxane polymer (PDMS) in a Brabender internal mixer. In every case, the mixing procedure used was the same. According to the procedure, the mixer blades were initiated so as to rotate at maximum speed, the required quantity of PDMS was placed in the mixer, the required quantity of treated kaolin was added to the mixer, and once the kaolin addition had been completed, the mixer was allowed to run for an additional 30 minutes. The fill level of the mixer was kept constant by calculating the amount of kaolin and PDMS in volumetric terms. This was done on the assumption that the density of PDMS was 1.0 gcm$^{-3}$, and that the density of the treated kaolin was 2.2 gcm$^{-3}$.

Testing of The Compounds

The treated kaolin compounds prepared as described above, were mixed with the suitable heat activated curing agent(s) on a two-roll mill. The compounds were then crosslinked, and/or cured, into test sheets by the application of heat and pressure in a suitable mould.

Example 1

Untreated Kaolin Filler (i) Comparative tests were initially undertaken utilizing the following 5 potential fillers. 100 parts by weight of 5 different untreated extending fillers:
 i. Talc.
 ii. Quartz.
 iii. Diatomaceous Earth.
 iv. Montmorillonite
 v. Kaolin In each sample prepared 100 parts of the respective filler were mixed, as described above, with a) 50 parts by weight of a dimethylvinylsiloxy terminated dimethylsiloxane-methylvinylsiloxane co-polymer (in which the mole ratio of dimethylsiloxane units to methylvinylsiloxane units was=99.82:0.18) having an average degree of polymerisation (dp) of 7,000; and b) 50 parts by weight of a dimethylvinylsiloxy terminated polydimethylsiloxane with an average dp of 7,000.

The resulting silicone rubber composition was vulcanised with 1.5 parts per 100 gm of a mixture of 2,4-dichlorobenzoyl peroxide (50% by weight) and silicone fluid, press moulded for 5 minutes at 116° C. under a pressure of 2 MPa to form a silicone rubber sheet with a thickness of 2 mm, which was then placed for 4 hours in a heat-circulation type oven at 200° C. Specimens were cut from the resultant sheet and mechanical properties were measured. Tensile and Elongation where determined by DIN 53 504. Durometer (Shore A) was determined by ASTM D2240. The montmorillonite extending filler inhibited the cure of 2,4-dichlorobenzoyl peroxide and as such did not cure. The results are shown in table 1a.

TABLE 1a

Physical properties from typical extending fillers

| Property | Talc | Quartz | Diatomaceous Earth | Montmorillonite | Kaolin |
| --- | --- | --- | --- | --- | --- |
| Durometer (Shore A) | 50 | 42 | 66 | DNC | 57 |

TABLE 1a-continued

Physical properties from typical extending fillers

| Property | Talc | Quartz | Diatomaceous Earth | Montmorillonite | Kaolin |
|---|---|---|---|---|---|
| Elongation (%) | 147 | 174 | 136 | DNC | 163 |
| Tensile Strength (Mpa) | 4.5 | 4.0 | 4.7 | DNC | 6.1 |

DNC = Did Not Cure

Table 1a shows a range of physical properties which were measured from a selection of commercially available mineral fillers it will be noted that of the fillers used only kaolin was able to provide a silicone rubber having the required physical properties. It is to be noted that in particular untreated kaolin filler silicone rubber gave significantly better tensile strength results.

In view of the latter the untreated kaolin samples were further analysed with respect to the effect of heat aging on the mechanical properties of the untreated kaolin filled silicone rubbers Example 1a was repeated except that 100 parts by weight of an untreated kaolin filler was used. In addition, the specimens were subjected to heat treatment in a heat circulating oven at 200° C. for 3 day, 7 day, and 10 day times of duration. Specimens were also subjected to heat treatment in a heat circulating oven at temperatures of 200° C. for 3 day, 7 day, and 10 day times of duration whereupon the mechanical properties were re-measured, and the percent difference was determined. The results are shown in Table 1b.

TABLE 1b

Mechanical Properties of Untreated Kaolin - Initially and After Heat Aging for 3, 7 and 10 days at 200° C.

| Property | Initial | Three Day Percent Difference | Seven Day Percent Difference | Ten Day Percent Difference |
|---|---|---|---|---|
| Durometer (Shore A) | 57 | +44 | +58 | +39 |
| Elongation (percent) | 163 | −56.0 | −79.0 | −78 |
| Tensile (Mpa) | 6.1 | −16.4 | −28.0 | −38 |

It will be seen that whilst the initial mechanical properties fall with the required range of values when using untreated kaolin, heat aging results in the rubber becoming brittle and disintegrating as it is no longer elastomeric as seen by the fact that the hardness significantly increases and the elongation and tensile strength of the rubber containing untreated kaolin loses the majority of its elongation properties and a substantial proportion of its tensile strength. Hence, untreated kaolin may not be used for applications involving heat treatments.

Example 2

Effect of Treatment Level Using Phenyltrimethoxysilane 100 parts by weight of treated kaolin filler with treatment levels of phenyltrimethoxysilane of 3.7 gram, 7.4 gram, and 9.3 gram per 100 grams of kaolin were prepared as described above in Procedure A, and mixed, as described above, with
a) 50 parts by weight of a dimethylvinylsiloxy terminated dimethylsiloxane-methylvinylsiloxane copolymer, in which the mole ratio of dimethylsiloxane units to methylvinylsiloxane units was 99.82:0.18, with an average dp of 7,000; and
b) 50 parts by weight of a dimethylvinylsiloxy terminated polydimethylsiloxane with an average dp of 7,000, having both of its terminal ends of the molecular chain endblocked by dimethylvinylsiloxy groups.

The resulting silicone rubber composition was vulcanised with 1.5 parts per 100 grams of a mixture containing 50 percent by weight of 2,4-dichlorobenzoyl peroxide and 50 percent by weight of a silicone fluid. It was press moulded for 5 minutes at 116° C. under a pressure of 2 Mpa, and formed a silicone rubber sheet with a thickness of 2 mm. The sheet was then placed in a heat circulation oven for four hours at 200° C. Specimens were cut from the resultant sheet, and its mechanical properties were measured. Tensile Strength and Elongation to Break where determined by DIN 53 504. Durometer (Shore A) Hardness was determined by ASTM D2240, and Tear Strength was determined by ASTM D624B. Specimens were also subjected to heat treatment in a heat circulating oven at temperatures of 200° C. for 10 days, whereupon the mechanical properties were re-measured, and the percent difference was determined. The results are shown in Table 2.

TABLE 2

Effect of Treatment Level of Phenyltrimethoxysilane on Mechanical Properties - Initially and After Heat Aging at 200° C.

| Property | 3.7 grams of Silane per 100 grams of kaolin | 7.4 grams of Silane per 100 grams of kaolin | 9.3 grams of Silane per 100 grams of kaolin |
|---|---|---|---|
| Durometer (Shore A) | 54 | 52 | 58 |
| Elongation (percent) | 164 | 178 | 185 |
| Tensile (Mpa) | 6 | 6.1 | 5.3 |
| Tear (kN/m) | 13.4 | 12.18 | 12.79 |
| Percent difference after aging @ 200° C. for 10 days | | | |
| Durometer (Shore A) | +66.7 | +11.53 | 0 |
| Elongation (percent) | −40.24 | −12.35 | +11.32 |
| Tensile (Mpa) | +6.6 | +4.91 | +5.0 |

Example 3

Effect of Treatment Level Using Methyltrimethoxysilane

Example 2 with the exception that 100 parts by weight of treated kaolin filler with treatment levels of methyltrimethoxysilane of 3.8 gram, 5.1 gram, and 6.4 gram per 100 grams of kaolin, was used. The results are shown in Table 3.

TABLE 3

Effect of Treatment Level of Methyltrimethoxysilane on Mechanical Properties - Initially and After Heat Aging at 200° C.

| Property | 3.8 grams of Silane per 100 grams of kaolin | 5.1 grams of Silane per 100 grams of kaolin | 6.4 grams of Silane per 100 grams of kaolin |
|---|---|---|---|
| Durometer (Shore A) | 58 | 59 | 59 |
| Elongation (percent) | 161 | 153 | 152 |
| Tensile (Mpa) | 6.7 | 6.3 | 6.2 |
| Tear (kN/m) | 11.63 | 12.2 | 13.12 |

TABLE 3-continued

Effect of Treatment Level of Methyltrimethoxysilane on Mechanical Properties - Initially and After Heat Aging at 200° C.

| Property | 3.8 grams of Silane per 100 grams of kaolin | 5.1 grams of Silane per 100 grams of kaolin | 6.4 grams of Silane per 100 grams of kaolin |
|---|---|---|---|
| Percent difference after aging @ 200° C. for 10 days | | | |
| Durometer (Shore A) | +15.5 | +15.3 | +11.86 |
| Elongation (percent) | −15.5 | −9.15 | −23.68 |
| Tensile (Mpa) | −3.0 | 0 | −12.90 |

Example 4

Effect of Treatment Level with Phenyltrimethoxysilane and Vinyltrimethoxysilane

Example 2 was repeated with the exception that 100 parts by weight of treated kaolin filler with treatment levels of a mixture of phenyltrimethoxysilane and vinyltrimethoxysilane was used. The results are shown in Table 4. Treatment A is 2.77 grams of vinyltrimethoxysilane per 100 grams of kaolin; Treatment B is 2.77 grams of vinyltrimethoxysilane per 100 grams of kaolin and 0.92 grams of phenyltrimethoxysilane per 100 grams of kaolin; Treatment C is 2.77 grams of vinyltrimethoxysilane per 100 grams of kaolin and 1.84 grams of phenyltrimethoxysilane per 100 grams of kaolin; and Treatment D is 2.77 grams of vinyltrimethoxysilane per 100 grams of kaolin and 3.73 grams of phenyltrimethoxysilane per 100 grams of kaolin.

TABLE 4

Effect of Treatment ratio level on Mechanical Properties - Initially and After Heat Aging at 200° C.

| Property | Treatment A | Treatment B | Treatment C | Treatment D |
|---|---|---|---|---|
| Durometer (Shore A) | 59 | 59 | 59 | 57 |
| Elongation (percent) | 152 | 133 | 153 | 158 |
| Tensile (Mpa) | 6.3 | 5.9 | 6.5 | 6.4 |
| Tear (kN/m) | 16.5 | 13.8 | 13.6 | 13.0 |
| Percent difference after aging @ 200° C. for 10 days | | | | |
| Durometer (Shore A) | +42.4 | +37.2 | +32.2 | +31.6 |
| Elongation (percent) | −23.0 | −14.3 | −20.9 | −22.8 |
| Tensile (Mpa) | −7.9 | −6.8 | −12.2 | −20.6 |

Example 5

Effect of Peroxide Curing Agents on the Cure Characteristics of Phenyltrimethoxysilane Treated Kaolin Example 2 was repeated with the exception that 100 parts by weight of treated kaolin filler with a treatment level of phenyltrimethoxysilane of 3.7 grams per 100 grams of the kaolin was used. In addition, the resulting silicone rubber composition was vulcanised and cured under different conditions using four different organic peroxide systems as follows:

(i) 1.5 parts per 100 grams of a mixture containing 50 percent by weight of 2,4-dichlorobenzoyl peroxide and 50 percent by weight of a silicone fluid, and cured for 5 minutes at 116° C.,
(ii) 1.5 parts per 100 grams of a mixture of containing 40 percent by weight of dicumyl peroxide and 60 percent by weight of a silicone fluid, and cured for 10 minutes at 150° C.,
(iii) 1.0 part per 100 grams of a mixture containing 50 percent by weight of dibenzoyl peroxide and 50 percent by weight of a silicone fluid, and cured for 5 minutes at 127° C., and
(iv) 1.0 part per 100 grams of a mixture containing 45 percent by weight of 2,5-bis (t-butyl peroxy)-2,5-dimethyl hexane and 55 percent by weight of a silicone fluid, and cured for 10 minutes at 171° C.

A moving die rheometer, Model MDR 2000E manufactured by Alfa Technologies Inc. was used to achieve a maximum torque value which is indicative of the final state of vulcanisation. The torque/time values were measured at 0 percent, 10 percent, and 90 percent, of the final torque value and are an indicator of the rate of cure. The results are shown in Table 5. In Table 5, DCBP is 2,4-dichlorobenzoyl peroxide, DCP is dicumyl peroxide, DBP is dibenzoyl peroxide, and BTBP is 2,5-bis-(t-butyl peroxy)-2,5-dimethylhexane.

TABLE 5

Effect of Curing agents on the Cure Characteristics of Treated kaolin

| Measurement | DCBP | DCP | DBP | BTBP |
|---|---|---|---|---|
| Time to reach indicated extent of cure* (metric minutes) | | | | |
| 10 percent | 0.33 | 9.51 | 0.34 | 0.57 |
| 90 percent | 0.86 | 9.50 | 1.12 | 5.58 |
| 100 percent | 5 | 10 | 5 | 10 |
| MDR Torque values at different extents of cure | | | | |
| 0 percent | 1.27 | 0.95 | 1.15 | 0.65 |
| 10 percent | 2.46 | 0.19 | 0.81 | 0.37 |
| 90 percent | 16.97 | 0.20 | 15.08 | 5.11 |
| 100 percent | 18.76 | 0.19 | 16.69 | 5.63 |

*Indicates that 100 percent cure is considered the torque value at the end point of the test Example 6

Effect of Hydrosilylation Curing Agent on the Cure Characteristics of Phenyltrimethoxysilane Treated Kaolin Example 2 was repeated with the exception that 100 parts by weight of treated kaolin filler with a treatment level of phenyltrimethoxysilane of 3.7 grams per 100 grams of the kaolin was used. In addition, the resulting silicone rubber composition was vulcanised and cured using a hydrosilylation curing system comprising:

i) 2.5 parts by weight per 100 parts by weight of polymer of a mixture containing 10% by weight of 1-ethynyl-1cyclohexanol inhibitor and 90% high molecular weight siloxane polymer;
ii) 9.0 parts by weight per 100 parts by weight of polymer of a mixture containing 20% by weight of an organopolysiloxane containing at least 2 Si—H groups per molecule and 80% of high molecular weight polymer;
iii) 0.85 parts by weight per 100 parts by weight of polymer of a mixture containing 0.2% of a platinum based complex catalyst and 99.8% polydimethylsiloxane.

The resulting composition was cured for 10 min at a temperature of 150° C.

TABLE 6

| Measurement | Hydrosilylation cure |
|---|---|
| Time to reach indicated extent of cure* (metric minutes) | |
| 10 percent | 0.43 |
| 90 percent | 0.75 |
| 100 percent | 10 |
| MDR Torque values at different extents of cure | |
| 0 percent | 0.84 |
| 10 percent | 1.99 |
| 90 percent | 12.86 |
| 100 percent | 13.83 |

*Indicates that 100 percent cure is considered the torque value at the end point of the test Example 7

Effect of Treated Kaolin Filler in a Low Viscosity Silicone Polymer 200 parts by weight of a treated kaolin filler with a treatment level of 3.7 grams of phenyltrimethoxysilane per 100 grams of the kaolin, was prepared as described above in Procedure A. The treated kaolin was mixed with 100 parts by weight of a dimethylvinylsiloxy terminated polydimethylsiloxane with an average dp of about 850, using a Brabender mixer operated at a mixing speed of 120 revolutions per minute/12.6 radian per second. After a mixing time of 70 minutes, an additional 100 parts by weight of a dimethylvinylsiloxy terminated dimethylsiloxane-methylvinylsiloxane co-polymer in which the mole ratio of dimethylsiloxane units to methylvinylsiloxane units was 99.82:0.18, having an average dp of 7,000, was put into the mixer.

The resulting silicone rubber composition was vulcanised with 1.5 parts per 100 grams of a mixture of 50 percent by weight of 2,4-dichlorobenzoyl peroxide and 50 percent by weight of a silicone fluid. It was press moulded for 5 minutes at 116° C. under a pressure of 2 MPa and formed a silicone rubber sheet with a thickness of 2 mm. The sheet was then placed in a heat circulation oven for 4 hours at 200° C. Specimens were cut from the sheet and mechanical properties were measured. Tensile Strength and Elongation to Break where determined by DIN 53 504. Durometer (Shore A) Hardness was determined by ASTM D2240. The results are shown in Table 6.

TABLE 7

Effect of Treated Kaolin Filler in the Low Viscosity Silicone Polymer of Example 7

| Property | Elastomer Containing a Treated Kaolin Filler |
|---|---|
| Durometer (Shore A) | 59 |
| Elongation (percent) | 177 |
| Tensile (Mpa) | 7.0 |
| Tear (kN/m) | 13.6 |

The results shown above in these Examples indicate that the silicone rubber compositions according to the invention have equivalent mechanical properties to conventional silicone rubber compositions, but can be produced in a process which avoids the need for heating and the necessity to use expensive fumed silica as a filler.

Other variations may be made in compounds, compositions, and methods described herein without departing from the essential features of the invention. The embodiments of the invention specifically illustrated herein are exemplary only and not intended as limitations on their scope except as defined in the appended claims.

Example 8

Accelerated U.V Exposure Testing

Two samples of different compositions were prepared.

Sample 8.1 was prepared in accordance with the method described in Example 2 with the exception that 100 parts by weight of treated kaolin filler with a treatment level of phenyltrimethoxysilane of 3.7 grams per 100 grams of the kaolin was used. In addition, the resulting silicone rubber composition was vulcanised with 1.5 parts per 100 grams of a mixture containing 50 percent by weight of 2,4-dichlorobenzoyl peroxide and 50 percent by weight of a silicone fluid. The resulting composition was cured for 5 minutes at 116° C., The resulting sample was aged in using ASTM Test protocol G154-00a$^{\epsilon 1}$ with bulb type UVA 340. The exposure cycle used for UV aging was 4 hours UV at 60° C. (+/−3° C.) black panel temperature followed by 4 hours condensation at 50° C. (+/−3° C.) black panel temperature. Physical property tests were carried out on the unaged sample (initial) and UV aged sample following the criteria defined in ASTM C 1115-00 using test method D2240 to determine Shore A Hardness, test method D395 to determine compression set (max %) and test method D412 for tensile strength and elongation. The results for sample 8.1 are provided in Table 8.1 below.

TABLE 8.1 physical property results for sample 8.1

| Property | INITIAL | 1000 hrs percent/UV condensation cycle/percent difference | 3000 hrs/UV condensation cycle/percent difference |
|---|---|---|---|
| Durometer (shore A) | 57.3 | +4.7 | +10.12 |
| Elongation (percent) | 157 | −7.0 | +7.2 |
| Tensile Strength (MPA) | 6.8 | −13.23 | −2.9 |
| Compression Set (percent) | 11.9 | +2.8 | +25 |

Sample 8.2 was prepared in accordance with the method described in Example 2 with the exception that 100 parts by weight of treated kaolin filler with a treatment level of methyltrimethoxysilane of 3.8 grams per 100 grams of the kaolin was used. In addition, the resulting silicone rubber composition was vulcanised with 1.5 parts per 100 grams of a mixture containing 50 percent by weight of 2,4-dichlorobenzoyl peroxide and 50 percent by weight of a silicone fluid. The resulting composition was cured for 5 minutes at 116° C.

The same tests were undertaken as described above with respect to sample 8.1 and the results are provided in Table 8.2 below

TABLE 8.2 physical property results for sample 8.2

| Property | INITIAL | 1000 hrs percent/UV condensation cycle/percent difference | 3000 hrs/UV condensation cycle/percent difference |
|---|---|---|---|
| Durometer (shore A) | 59.9 | +6.8 | +8.0 |
| Elongation (percent) | 167 | −7.6 | −6.12 |
| Tensile Strength (MPA) | 7.4 | −6.8 | −9.5 |
| Compression Set (percent) | 12.2 | −23.48 | −11.3 |

Example 9

Preparation of a Silicone Rubber Sponge using a Composition in Accordance with the Present Invention 100 parts by weight of treated kaolin filler with a treatment level of methyltrimethoxysilane of 3.8 grams per 100 grams of the kaolin were prepared as described above in Procedure A, and mixed, as described above, with 50 parts by weight of a dimethylvinylsiloxy terminated dimethylsiloxane-methylvinylsiloxane copolymer, in which the mole ratio of dimethylsiloxane units to methylvinylsiloxane units was 99.82:0.18, with an average dp of 7,000; and 50 parts by weight of a dimethylvinylsiloxy terminated polydimethylsiloxane with an average dp of 7,000, having both of its terminal ends of the molecular chain endblocked by dimethylvinylsiloxy groups.

A silicone rubber sponge was prepared by the addition of 0.7 g per 100 g of a foaming agent. 1.0 gm per 100 g of the composition comprising a mixture containing 20% SIH functional siloxane and 80% of high molecular weight polymer and 0.2 gm per 100 gm of a mixture containing encapsulated platinum based catalyst.

The Foaming agent was a mixture of water, hollow Silicone resin particles of the type described in EP0820807 and a surfactant comprising 5>15% non-ionic surfactant and 15>30% anionic surfactant.

The resulting composition was hand mixed using a spatula and then the Treated kaolin (as above) was mixed on 2 roll mill with foaming agent, Crosslinker and catalyst (as above). The resulting silicone composition was cured at 250° C. for 10 minutes. The resulting sponge material was visually inspected and was found to be homogeneously sponged.

The invention claimed is:

1. A treated kaolin containing silicone rubber composition comprising:
   (i) one or more polymers which have the formula

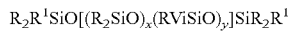

wherein each R is the same or different and is an alkyl group containing 1-6 carbon atoms, a phenyl group or a 3,3,3-trifluoroalkyl group, $R^1$ is a hydroxy group or an alkenyl group, x is an integer, y is zero or an integer, and x+y is between 700 and 10 000;
   (ii) treated kaolin
   (iii) a curing agent; and
   (iv) optional additives selected from the group of one or more rheology modifiers, pigments, colouring agents, anti-adhesive agents, plasticizers, adhesion promoters, blowing agents, fire retardants and dessicants,
   which composition is substantially free of reinforcing fillers; and
   wherein said treated kaolin comprises a kaolin treated with an alkoxysilane of the formula $R_{(4-n)}Si(OR)_n$ wherein n has a value of 1-3; and R is an alkyl group or an aryl group.

2. A composition according to claim 1 wherein the polymer(s) comprise(s) a mixture of two polysiloxane gums having the formula $R_2ViSiO[(R_2SiO)_x(RViSiO)_y]SiR_2Vi$ and the formula $R_2ViSi(R_2SiO)_xSiR_2Vi$ wherein in each formula, R represents an alkyl group containing 1-6 carbon atoms; Vi represents the vinyl group; and x and y each have values of 500-1,000.

3. A composition according to claim 1 wherein the alkoxysilane is a compound selected from the group consisting of methyltriethoxysilane, methyltrimethoxysilane, phenyltrimethoxysilane, and combinations thereof.

4. A composition according to claim 1 wherein the composition comprises about equal amounts of the polymer(s) and the kaolin.

5. A composition according to claim 1 wherein the curing agent is a peroxide selected from the group consisting of benzoyl peroxide, 2,4-dichlorobenzoyl peroxide, di-t-butyl peroxide, and dicumyl peroxide.

6. A composition in accordance with claim 1 wherein the curing agent is an organohydrogensiloxane curing agent, and a platinum group metal hydrosilylation catalyst is added in an amount sufficient to cure the composition.

7. A method of making a treated kaolin containing silicone rubber composition comprising:
   (i) one or more polymers which have the formula

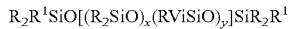

wherein each R is the same or different and is an alkyl group containing 1-6 carbon atoms, a phenyl group or a 3,3,3-trifluoroalkyl group, $R^1$ is a hydroxy group or an alkenyl group, x is an integer, y is zero or an integer, and x+y is between 700 and 10 000;
   (ii) treated kaolin
   (iii) a curing agent; and
   (iv) optional additives selected from the group of one or more rheology modifiers, pigments, colouring agents, anti-adhesive agents, plasticizers, adhesion promoters, blowing agents, fire retardants and dessicants,
   which composition is substantially free of reinforcing fillers, and
   wherein the treated kaolin comprises a kaolin treated with an alkoxysilane of the formula $R_{(4-n)}Si(OR)_n$ wherein n has a value of 1-3; and R is an alkyl group or an aryl group, and
   which method consists essentially of the steps:
   (i) mixing the polymer(s) and treated kaolin under room temperature conditions,
   (ii) adding a curing agent to the mixture in (i); and curing the mixture in (ii) at a temperature above room temperature by the application of heat.

8. A method according to claim 7 in which room temperature is normal ambient temperature of 20-25° C.

9. A composition according to claim 1 wherein each R group is a methyl or ethyl group.

10. A treated kaolin containing silicone rubber composition comprising:
    (i) 100 parts by weight of a polysiloxane gum comprising equal parts by weight of;
       (a) a first polysiloxane gum, and
       (b) a second polysiloxane gum different from the first polysiloxane gum, wherein the first and second polysiloxane gums independently have the formula $R_2R^1SiO[(R_2SiO)_x(RViSiO)_y]SiR_2R^1$ and wherein each R is the same or different and is an alkyl group containing 1-6 carbon atoms, a phenyl group or a 3,3,3-trifluoroalkyl group, $R^1$ is a hydroxy group or an alkenyl group, x is an integer, y is zero or an integer, and x+y is between 700 and 10 000;

(ii) calcined kaolin treated with an alkyoxysilane selected from the group consisting of methyltriethoxysilane, methyltrimethoxysilane, phenyltrimethoxysilane, and combinations thereof;

(iii) a curing agent; and (iv) optional additives selected from the group of one or more rheology modifiers, pigments, colouring agents, anti-adhesive agents, plasticizers, adhesion promoters, blowing agents, fire retardants and dessicants, which composition is substantially free of reinforcing fillers.

11. A composition according to claim 10 wherein the first polysiloxane gum has the formula $R_2ViSiO[(R_2SiO)_x(RViSiO)_y]SiR_2Vi$ and the second polysiloxane gum has the formula $R_2ViSi(R_2SiO)_xSiR_2Vi$ wherein in each formula, R represents an alkyl group containing 1-6 carbon atoms; Vi represents the vinyl group; and x and y each have values of 500-1,000.

12. A composition according to claim 11 wherein each R group is a methyl or ethyl group.

13. A composition according to claim 12 wherein the curing agent is a peroxide selected from the group consisting of benzoyl peroxide, 2,4-dichlorobenzoyl peroxide, di-t-butyl peroxide, and dicumyl peroxide.

14. A composition in accordance with claim 12 wherein the curing agent is an organohydrogensiloxane curing agent, and a platinum group metal hydrosilylation catalyst is added in an amount sufficient to cure the composition.

15. A composition according to claim 11 wherein the curing agent is a peroxide selected from the group consisting of benzoyl peroxide, 2,4-dichlorobenzoyl peroxide, di-t-butyl peroxide, and dicumyl peroxide.

16. A composition in accordance with claim 11 wherein the curing agent is an organohydrogensiloxane curing agent, and a platinum group metal hydrosilylation catalyst is added in an amount sufficient to cure the composition.

17. A composition according to claim 10 wherein the curing agent is a peroxide selected from the group consisting of benzoyl peroxide, 2,4-dichlorobenzoyl peroxide, di-t-butyl peroxide, and dicumyl peroxide.

18. A composition in accordance with claim 10 wherein the curing agent is an organohydrogensiloxane curing agent, and a platinum group metal hydrosilylation catalyst is added in an amount sufficient to cure the composition.

19. A treated kaolin containing silicone rubber composition in accordance with claim 1 wherein said (i) one or more polymers have a viscosity of 1,000,000 centistokes or more.

20. A method in accordance with claim 7 wherein the (i) one or more polymers have a viscosity of 1,000,000 centistokes or more.

21. A treated kaolin containing silicone rubber composition in accordance with claim 10 wherein said (i) polysiloxane gum has a viscosity of 1,000,000 centistokes or more.

* * * * *